United States Patent [19]

Okada et al.

[11] Patent Number: 4,643,865
[45] Date of Patent: Feb. 17, 1987

[54] PROCESS FOR THE PRODUCTION OF A DRAWN PRODUCT OF CRYSTALLINE POLYMER HAVING HIGH TENACITY AND HIGH MODULUS

[75] Inventors: Fujio Okada, Shiga; Toshihiko Ohta, Otsu, both of Japan

[73] Assignee: Toyo Boseki Kabushiki Kaisha, Japan

[21] Appl. No.: 669,541

[22] Filed: Nov. 8, 1984

[30] Foreign Application Priority Data

Nov. 8, 1983 [JP] Japan ................................ 58-210589

[51] Int. Cl.⁴ ............................................. B29C 55/00
[52] U.S. Cl. .................................. 264/288.4; 264/204; 264/206; 264/280
[58] Field of Search .................. 264/164, 210.2, 210.8, 264/176 F, 204, 206, 288.4, 280

[56] References Cited

U.S. PATENT DOCUMENTS 4,344,908 8/1982 Smith et al. .......................... 264/205
4,413,110 11/1983 Kavesh et al. ...................... 264/164

FOREIGN PATENT DOCUMENTS 2060469 5/1981 United Kingdom .

OTHER PUBLICATIONS

Perkins et al., "Effect of MCU on Phys and Mch Prop of Ultra-Drawn High Dens PE"; PE and S 3/76, vol. 16, No. 3.

Smith et al., "Ultradrawing of High MW PE Cost from Solution: Influence of Int Poly Comp"; J of PS, 1981, vol. 19, 887–888.

Primary Examiner—Jan Silbaugh
Assistant Examiner—Hubert C. Lorin
Attorney, Agent, or Firm—Jones, Tullar & Cooper

[57] ABSTRACT

A process for producing a drawn product of a crystalline polymer having tenacity and high modulus, which comprises compressing a gel-like material prepared from a solution of a crystalline polymer in a solvent (i.e. a gel-like sheet material (A) consisting of gel-like particles of a crystalline polymer and a solvent which is prepared by cooling a solution of a crystalline polymer in a solvent, or a gel-like film material (B) which is prepared by casting a solution of a crystalline polymer in a solvent) at a temperature lower than the temperature at which the gel-like material is dissolved, whereby removing a part of the solvent contained in the gel-like material, and drawing the compressed material, preferably using a drawing die. The drawn product is particularly useful as a tension member for optical fiber cable.

9 Claims, 2 Drawing Figures

PROCESS FOR THE PRODUCTION OF A DRAWN PRODUCT OF CRYSTALLINE POLYMER HAVING HIGH TENACITY AND HIGH MODULUS

TECHNICAL FIELD

The present invention relates to a drawn product of a crystalline polymer having high tenacity and high modulus, and a process for the production thereof. More particularly, it relates to a drawn product of a crystalline polymer having high tenacity and high modulus which is produced by drawing a gel-like material (gel-like sheet or gel-like film) prepared by cooling a solution of a crystalline polymer and removing a part of the solvent by compression. This process is particularly useful for production of a drawn product having a large section, particularly round filaments having a large section.

Hitherto, steel filaments having a large section have been used as a tension member for optical fiber cable, but these filaments have a problem of electromagnetic interference due to lightning strikes. There has been developed, for example, pole-like plastic composite materials reinforced by Kevlar fibers as a substitute. Besides, the steel filaments having a large section are also used for other utilities in addition to the tension member, but they have an essential problem in lightness thereof. The above plastic composite materials are also noticed as a substitute of the latter. However, these plastic composite materials are far more expensive than the steel filaments, and hence, they are still not practically used.

Thus, it is desired to develop organic materials having a large cross sectional area which are cheaper and have higher tenacity (preferably 1.5 GPa or more) and higher modulus (preferably 50 GPa or more) than the plastic composite materials. The present invention provides a drawn product of crystalline polymer having the desired properties which can be used in various kinds of utilities and the process for the production thereof.

PRIOR ART

There have hitherto been done various studies on production of organic or inorganic fibers having high tenacity and high modulus, and it has also been tried to produce fibers having high tenacity and high modulus from a flexible, crystalline polymer (cf. for example, T. Ohta, Polymer Eng. Sci., 23, 697, 1983). However, such fibers from a flexible polymer have never industrially been produced.

As a process relevant to the present invention, the following four processes are known.

(1) A process comprising drawing gel-like fibers prepared by spinning a solution of a crystalline polymer.

(2) A process comprising casting a solution of a crystalline polymer, drying the thus obtained gel-like film at room temperature for a long period of time to remove the solvent, and then drawing the resultant.

(3) A process comprising super-drawing of single crystal prepared by crystallization from a dilute solution of a crystalline polymer.

(4) A process comprising drawing a melt molded billet of a crystalline polymer with a die.

These processes (1) to (4) are not suitable for producing the desired drawn product of a crystalline polymer having high tenacity and high modulus and having a large section, particularly a sectional area of 0.1 mm$^2$ or larger, and have the following problems.

As to the process (1), for example, there is disclosed in U.S. Pat. No. 4,344,908 (corresponding to Japanese Patent First Publication No. 107506/1980) a process comprising spinning a solution of polyethylene and heat-drawing the thus obtained gel-like fibers. Besides, it is disclosed in U.S. Pat. No. 4,413,110 (corresponding to Japanese Patent First Publication No. 5228/1983) that filaments or films are prepared by spinning or extruding a solution of a polymer such as polyethylene. It is also disclosed in Polymer Bulletin, Vol. 2, 775–783 (1980) that gel-like filaments are prepared by cutting gels of polyethylene containing paraffin oil, supplying the cut gels thus-prepared to an extruder, heating the gels, and then spinning the resulting solution.

In all these known processes, a solution of a polymer is spun or extruded. When the polymer content in the starting solution becomes higher, the solvent can be used in less amount, which is advantageous in view of low cost, but it tends disadvantageously to become difficult in the drawing of the shaped gel-like material at a high draw ratio, and hence, these processes can hardly give the desired drawn product having high tenacity and high modulus.

On the other hand, when the polymer content in the starting solution becomes lower, the gelation proceeds at lower speed, which results in other various problems, such as difficulty in reel up of the spun or extruded filaments, difficulty in handling because of softness of the shaped gel-like material, and further irregularity of the sectional shape of the final drawn product. These problems are particularly important for producing filaments having a large section and drawn products having a large sectional area, because the starting gel-like fibers prepared by spinning of a solution must have such a large diameter of more than 40 mm in order to produce the final filaments having such a large diameter as 1 mm.

Thus, the polymer solution used in the process (1) has to have a higher concentration of the polymer even though the final drawn product shows less tenacity and less modulus.

As to the process (2), there is reported a process comprising casting a solution of polyethylene having extremely high molecular weight, drying a gel-like film thus obtained at room temperature for a long period of time to remove the solvent, and then heat-drawing the thus-prepared film by P. J. Lemstra et al. (cf. J. Polymer Sci., Polymer Phys., 19, 877, 1981) and Matsuo et al. (cf. Polymer Preprints, Japan, 32, 841, 1983). According to this process, the cast film shows various maximum draw ratios depending on the concentration of polyethylene in the starting solution, and when the polyethylene concentration is lower, the maximum draw ratio becomes larger, which can advantageously give the drawn product having higher tenacity and higher modulus. However, this process disadvantageously requires a long period of time for drying in order to remove the large amount of solvent contained in the gel-like film. In case of producing the final drawn product having a large sectional area, the gel-like film must have a larger thickness, which requires a much longer period of time for drying. Besides, in such a case, it is also difficult to obtain a cast film having uniform thickness, i.e. less difference in thickness between the inner layer and the outer layer.

As to the process (3), there is reported a process comprising cooling a dilute solution of polyethylene having an extremely high molecular weight to form a single crystal, collecting and drying the single crystal to obtain a single crystal mat, subjecting the mat to compression or solid phase co-extrusion, and then heat-drawing it at a total draw ratio of 200 or more to give the desired polyethylene drawn product having high tenacity and high modulus (cf. Kanemoto et al., Polymer Preprints, Japan, 32, 741, 1983; and Miyasaka et al., Polymer Preprints, Japan, 32, 874, 1983). However, this process is unproductive in the steps of precipitation of a single crystal, collection thereof, and drying to prepare a single crystal mat. Moreover, it has a problem that the compressed or extruded mat must be drawn at such a high draw ratio as 200 or more. This high draw ratio may be due to the too low concentration of polyethylene in the starting solution, by which there is little present a molecule for connecting each single crystal.

As to the process (4), I. M. Ward et al. have reported a process for producing a polyethylene drawn product having a high modulus and a large section (cf. British Pat. No. 2,060,469). This process comprises melt-molding polyethylene having a weight average molecular weight of $5 \times 10^4$–$5 \times 10^5$, and drawing the thus-prepared billet through a die. It is disclosed in the above literature that when the polyethylene has a weight average molecular weight of 67,800, 102,000 and 135,000, the final products show a total draw ratio of 15 to 24 and a flexural Young's modulus of 40 to 50 GPa. However, when the polyethylene has a weight average molecular weight of $3 \times 10^5$ or more, the total draw ratio of the product decreases to about 10, i.e. is approximately halved, and hence, the flexural Young's modulus is also decreased to less than 14 GPa, which product is no longer a high elastic product. Besides, the above literature mentions or suggests neither the tenacity of the product nor a process for producing a drawn product having high tenacity and high modulus. Porter et al. have reported that they could have obtained a drawn product having a high modulus of about 70 GPa by molding a billet from a molten polyethylene having a weight average molecular weight of 147,000 and subjecting the billet to solid phase extrusion at a total draw ratio of 52, but this product has merely a tenacity of less than 0.7 GPa (cf. Polymer Eng. Sci., 16, 200, 1976). Since the process by I. M. Ward et al. as mentioned hereinbefore is similar to the above process of Porter et al. in the deformation mechanism of the billet, it is assumed that the product obtained by the Ward et al. process may have a tenacity of 1.0 GPa at most. Such a product is no longer a high tenacity product. Thus, according to the process of drawing a melt, molded product of a thermoplastic resin (e.g. polyethylene) through a die, there can be obtained a drawn product having high modulus, but can not be obtained a drawn product having high tenacity.

BRIEF SUMMARY OF THE INVENTION

Under the circumstances, the present inventors have intensively studied the noted problem and found an improved process for producing a drawn polymer product having both high tenacity and high modulus and having a large section, such as 0.1 mm² or more, which has never been known, without the problems of the known processes (1) to (4) as mentioned above. As a result, it has now been found that the desired drawn product having high tenacity and high modulus can be obtained by using a specific gel-like material (i.e. gel-like sheet or gel-like film) prepared by cooling or casting a solution of a crystalline polymer and drawing it after removing the solvent therefrom by compressing the gel-like material at a temperature lower than the temperature at which the gel-like material is dissolved.

An object of the present invention is to provide an improved process for producing a drawn product of a crystalline polymer having high tenacity and high modulus. Another object of the invention is to provide a process for producing a drawn polymer product having a large sectional area, such as 0.1 mm² or more. A further object of the invention is to provide a drawn product of a crystalline polymer having high tenacity and high modulus. A still further object of the invention is to provide a polyethylene drawn product having a sectional area of 0.1 mm² or more and having a tenacity of 20 g/d or more, an initial modulus of 500 g/d or more and a viscosity average molecular weight of $3 \times 10^5$ or more. These and other objects and advantages of the present invention will be apparent to persons skilled in the art from the following description.

DETAILED DESCRIPTION

Figure 1:
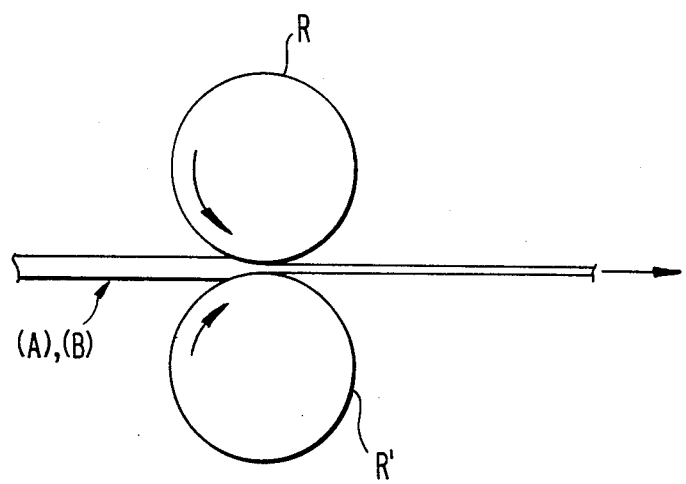
FIG. 1 shows an embodiment of the method for compression of the starting gel-like material by passing through a pair of rotating rolls.

According to the present invention, the desired drawn product of a crystalline polymer having high tenacity and high modulus can be produced by compressing a gel-like material prepared from a solution of a crystalline polymer at a temperature lower than the temperature at which the gel-like material is dissolved to remove a part of the solvent contained in the gel-like material, and then drawing the compressed gel-like material.

The crystalline polymer used in the present invention includes all crystalline polymers which can form fibers, and includes, for example, polyolefines such as polyethylene, polypropylene, ethylene-propylene copolymer; polyacrylonitriles; poly(fluorinated)vinylidenes; polyvinyl alcohols; various polyamides; and polyesters such as polyethylene terephthalate and polybutylene terephthalate. These polymers have preferably a high molecular weight because when the molecular weight is higher, the final product has higher tenacity and higher modulus, and they have usually a weight average molecular weight of $1 \times 10^5$ or more.

Among the above polymers, polyethylene type polymers which are determined as a linear polymer composed of ethylene component of more than 80% by weight, such as polyethylene, a copolymer of polyethylene and polypropylene, etc., are particularly preferable. When the crystalline polymer is a polyethylene type polymer having a viscosity average molecular weight of $3 \times 10^5$ or more (preferably in the range of $3 \times 10^5$ to $1 \times 10^7$), more preferably $1 \times 10^6$ or more (preferably in the range of $1 \times 10^6$ to $6 \times 10^6$), there can advantageously be obtained a final drawn product having higher tenacity and higher modulus.

The solvent used for the preparation of the solution of a crystalline polymer includes any solvent which can dissolve the polymer to form a solution which can form a gel-like material when cooled. These solvents may be used alone, but for satisfying the above condition, two or more solvents may be used together, or a solvent is mixed with a non-solvent. Suitable solvents may be different depending on the kinds of the crystalline polymer, and for example, in case of polyolefins such as polyethylene or polypropylene, suitable examples of the solvent are aliphatic hydrocarbons having a boiling point of 100° C. or higher (e.g. octene, nonane, decane, undecane, dodecane, or isomers thereof), alicyclic hydrocarbons (decaline), aromatic hydrocarbons (e.g. toluene, xylene, naphthalene, tetraline), high straight or branched chain hydrocarbons (e.g. decane, dodecane), and petroleum distillate fraction, and further halogenated hydrocarbons (e.g. trichlorobenzene), and the like. In case of polyacrylonitriles, suitable examples of the solvent are dimethylformamide, dimethylsulfoxide, -butyrolactone, and the like. In case of other polymers, appropriate solvents are used, which will be apparent to persons skilled in the art.

The gel-like material includes (A) a gel-like sheet material which is prepared by gradually cooling a solution of a crystalline polymer and (B) a gel-like film material which is prepared by casting a solution of a crystalline polymer.

The gel-like sheet material (A) comprises gel-like particles of a crystalline polymer and the solvent. The solution of a crystalline polymer should have a concentration suitable for forming the gel-like particles having a suitable particle size. Minimum concentration of the crystalline polymer in the solution is a critical concentration or higher at which the crystalline polymer starts to form mutual entanglement, i.e. so-called entanglement region or higher concentration. The critical concentration to start the mutual entanglement is the concentration at which the relation of the concentration of the solution and the zero shear viscosity varies. Generally, when the polymer concentration is too low, the polymer can not form gel-like particles, and on the other hand, when the polymer concentration is too high, the resulting gel-like sheet tends to be hardly drawn at a high draw ratio. For instance, when a polyethylene type polymer having a viscosity average molecular weight of $2 \times 10^6$ is used as the crystalline polymer, the solution of polymer has preferably a polymer concentration of 0.5 to 15% by weight, more preferably 1 to 10% by weight, particularly preferably 2 to 8% by weight.

The solution of a crystalline polymer is prepared in the following manner. A crystalline polymer is added to a suitable solvent in an appropriate weight ratio, and the mixture is stirred under heating at a temperature lower than the decomposition temperature of the crystalline polymer.

The gel-like sheet material (A) is prepared from the thus-obtained solution of a crystalline polymer in the following manner.

Firstly, the solution of a crystalline polymer is cooled so as to produce gel-like particles. The cooling is carried out as slow as possible, by which there is produced a suspension containing gel-like particles having an average particle size of 1 mm or less, preferably 10 to 200 μm, or aggregates of the particles, said gel-like particles occluding the solvent within the particles. The suspension is filtered as it stands or after mechanically stirring, for example, with a homomixer, by which a gel-like sheet material is formed, wherein the gel-like particles stand uniformly or in random in the plane form in a single layer or a plurality of layers in an appropriate thickness and the particles contact each other but occasionally stand without contact. Thus, in the gel-like sheet material, the gel-like particles stand in the sheet-like form, usually with contacting each other. In order to obtain the suitable gel-like sheet material, the above filtration of suspension is preferably carried out with a filter having good suction properties, such as wire net, cloth filter, and the like. A suitable machine for the filtration is a paper machine. The gel-like sheet material has a thickness suitable for carrying the subsequent compression, usually 2 to 10 mm. When the gel-like sheet material is difficult to keep its shape, it is preferably supplied to the subsequent compression step together with the filter such as wire net or cloth filter, i.e. in the state that the gel-like sheet material is kept on the filter.

The gel-like film material (B) is prepared by using the same solution of a crystalline polymer as prepared above, that is, by casting the solution in a thin thickness under cooling, by which the desired gel-like material is directly obtained. The casting is carried out with a conventional film-forming machine with a slit. The gel-like film material contains the solvent in the almost same amount as in the starting solution. The thickness of the gel-like film material is not critical, but it is important to make the thickness not too thick so as to compress easily in the subsequent step. The thickness is usually in the range of 0.3 to 2.0 mm.

The gel-like sheet material (A) is more preferable than the gel-like film material as the starting gel-like material, because the former can contain a larger amount of the polymer and a lesser amount of the solvent and can easily be compressed in the subsequent compression step in order to remove the solvent. That is, in case of the gel-like sheet material (A), the solvent contained in the material is easily removed in a larger amount, and hence, the material can more easily give the desired drawn product having excellent properties.

The process for producing a drawn product from the above gel-like material is explained in detail with reference to the accompanying drawing.

The compression of the gel-like material is carried out in order to remove effectively the solvent contained in the material. The compression is usually carried out by passing the gel-like material through a gap between a pair of rolls, to which a pressure may optionally be added, as is shown in the accompanying FIG. 1, wherein R and R' are the rotating rolls and (A), (B) mean the gel-like sheet material and the gel-like film material. When the gel-like material is merely extruded with an extruder under pressure instead of compressing with rolls, it is difficult to form the continuous compressed material from (A) and (B) because the solvent can not effectively be removed, but it rather inadvantageously results in phase separation of the solvent and the polymer.

It is important to do the compression at a temperature lower than the temperature at which the gel-like material is dissolved, but preferably not lower than room temperature. When the compression is done at a temperature higher than the temperature at which the gel-like material is dissolved, the desired drawn product having high tenacity and high modulus can not be obtained because the compressed material can not be drawn at a high draw ratio. A suitable temperature for the compression depends largely on the amount of the solvent contained in the starting gel-like material, but is usually in the range of 10° to 90° C. in case of polyethylene. The compression requires higher pressure when the gel-like material has a larger thickness, and hence, in order to prepare easily the desired compressed gel-like material, particularly, a compressed gel-like material having a high polymer content, the starting gel-like material should have a thinner thickness.

By the above compression, the gel-like material (gel-like sheet material or gel-like film material) releases a part or almost of the solvent contained therein to form a sheet-like compressed material containing a large amount of the crystalline polymer.

Thus, the present invention is characteristic in that the starting gel-like material is compressed at a temperature lower than the temperature at which the gel-like material is dissolved to form a sheet-like compressed material while releasing a part or almost of the solvent and is distinguished from the known processes in the manner of removal of the solvent. That is, according to the known processes comprising spinning or casting a solution of a crystalline polymer and drawing the gel-like fiber or gel-like film, the gel-like material is dried in the state that it contains the solvent or after replacing the solvent with other solvent or after removing the solvent by spontaneously drying, i.e. the solvent being not removed forcibly or mechanically. On the contrary, according to the present invention, the removal of solvent is done by compression, by which the compressed material from the gel-like sheet material (A) can be drawn at a draw ratio of 10 or more. Besides, while the gel-like film material may be drawn without subjecting to compression, in such a case, the drawing can not be done smoothly. When the gel-like film material is compressed to remove the solvent, the compressed material has less voids and can be smoothly drawn to give a drawn product having dense structure. Moreover, according to the known processes, the removal of solvent requires a far longer period of time in comparison with the process of the present invention, and further, the solvent can not easily be recovered. Accordingly, the process of the present invention is also advantageous from an economical viewpoint.

After the above compression step, the resulting sheet-like compressed material is subjected to drawing by conventional method under heating. The drawn product obtained by the drawing may have various shapes, such as tape-like shape, a flat sectional shape, round sectional shape, or any other sectional shapes. In order to prepare a drawn product having a round sectional shape, it is preferable to draw the compressed material through a die having a round-section opening. When dies having various sectional shapes are used, there can be obtained various drawn products having the corresponding sectional shapes.

Thus, the drawing of the present invention is preferably carried out by using a die. The die should have an opening area smaller than the sectional area of the compressed material to be supplied thereto. However, when the die has too small an opening area, the drawing can not effectively be done because of the possibility of breaking of the material. The die may be provided with a conical introducing part, by which the drawing of the compressed material can smoothly be done.

Figure 2:
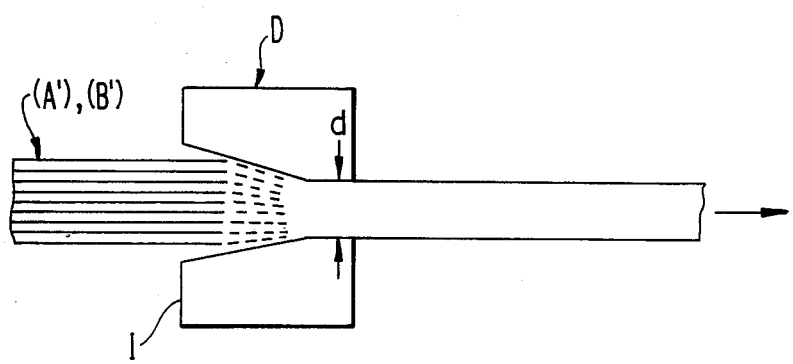
FIG. 2 shows an embodiment of the method for drawing a compressed material with a drawing die provided with an introducing part.

An embodiment of the drawing of the compressed material with a drawing die is shown in the accompanying FIG. 2, wherein D is a die, I is an introducing part, d is a diameter of the opening of the die, and (A'), (B') mean slit or folded compressed material prepared from the starting gel-like sheet material or gel-like film material. The drawing with a die is usually carried out at a temperature lower than the melting point of the compressed material to be supplied to the die. Besides, the die is heated at an appropriate temperature, so that the drawing is more easily done. The heating may be done with a heating device provided to the die and occasionally with a preheating device. A suitable temperature for heating the die depends on the kinds of the crystalline polymer, and is, for example, in the range of 90° to 130° C. in case of polyethylene. When the sheet-like compressed material is supplied to the die, it may be used as it stands or after being slit in an appropriate width. When it is used as it stands, it is preferably supplied into the die in the folded state, or in the state curled into a round shape. By drawing through a die like this, the sheet-like compressed material can be formed into a drawn product having round section, which has neither crevice nor marks due to folding or curling of the compressed material.

The drawing with a die may be done by using two or more dies in a plurality of steps, that is, firstly drawing with a die having a larger opening sectional area and secondly drawing the resulting drawn material with a die having a smaller opening sectional area. Particularly, in order to obtain a drawn product having a large size, such as a sectional area of 0.5 mm$^2$ or more, it is preferable to draw the compressed material with two or more dies.

After the drawing with a die, the drawn material is usually further drawn with stretching without using a die at a temperature as used in the drawing with a die or at a higher temperature. The compressed material is usually subjected to multi-step drawing with or without using a die as described above. In said drawing, the total draw ratio is preferably at least 20 (usually in the range of 20 to 200), particularly preferably at least 40 (preferably in the range of 40 to 150), in order to obtain the desired drawn product having higher tenacity and higher modulus.

The compressed material has preferably a high concentration of a the polymer, for example, in case of polyethylene compressed material, it contains 40 to 90% by weight of the polymer (when it is shown in the solvent content, it contains 60 to 10% by weight of the solvent). The remaining solvent contained in the compressed material, which can not be removed by the compression step, is usually spontaneously removed during the drawing step.

The drawn product obtained by the present invention has high tenacity and high modulus which may vary according to the kinds of the polymers, but has preferably a tenacity of 15 g/d (d means denier) or more, more preferably 20 g/d or more, and an initial modulus of 300 g/d or more, more preferably 500 g/d or more. Moreover, the drawn product of the present invention is characteristic in the large sectional area, such as 0.1 mm$^2$ or more. Such a drawn product having a large sectional area and having high tenacity and high modulus has never been known.

The present invention is illustrated by the following Examples, but should not be construed to be limited thereto.

In the Examples, the viscosity average molecular weight (Mv) of the polyethylene was determined by firstly measuring a viscosity of a solution thereof in decaline at 135° C. in the manner as described in ASTM D2857 to obtain an intrinsic viscosity $[\eta]$ thereof, and then applying the thus-obtained intrinsic viscosity to the following equation:

$$Mv = 3.64 \times 10^4 [\eta]^{1.39}$$

The tenacity and initial modulus were measured by a fixed rate-elongation method as disclosed in JIS-L-1013 (1981).

The temperature at which the gel-like material is dissolved was measured as follows. That is, the material to be measured (10 mg) was entered into a sealed vessel and then heated while raising the temperature at a rate of 5° C./minute with THARMOFLEX DSC 10A (manufactured by Rikagaku Denki K.K.), wherein the endothermic peak temperature was used as the dissolving temperature.

EXAMPLE 1

Polyethylene (viscosity average molecular weight: $2 \times 10^6$) is mixed with decaline, and the mixture is heated at 160° C. to give a solution having a polyethylene content of 3% by weight. The solution is cooled to room temperature over a period of about 10 hours to form a gel. The gel is pulverized with a homomixer to give a pulverized gel mixture which consists of gel-like particles (particle size: about 80μ) and solvent.

The gel mixture thus obtained is filtered with a cloth filter, by which a gel-like sheet material is formed on the filter in a thickness of about 4.0 mm. The gel-like sheet material still contains the solvent and has a polyethylene content of 16% by weight and a melting point of 92° C.

The gel-like sheet material thus obtained with the filter cloth is passed through a gap (0.7 mm) between a pair of metallic rolls (diameter of rolls: 150 mm, rotating speed of rolls: 7 revolutions/minute) at room temperature (27° C.), by which the material is compressed while squeezing out the solvent to give a compressed sheet. The compressed sheet thus obtained (thickness: 0.6 mm, width: 200 mm) has a polyethylene content of 48% by weight, which is not broken even if it is folded.

The compressed sheet thus obtained is supplied to a drawing die while folding in a width of about 15 mm, and thereby is drawn at a rate of 0.5 m/minute. The drawing die has a conical opening (diameter: 4 mm, length: 5 mm) and is provided with a conical introducing part (length: 40 mm, half angle: 10°) and is maintained at 110° C. By the drawing with a die, the compressed sheet is drawn at a draw ratio of 9.4, and the drawn product has a round section and has neither crevice nor marks due to folding of the compressed sheet.

The drawn material thus obtained is further drawn by stretching with a pair of rolls each having a different peripheral speed within an air vessel at 135° C. at a draw ratio of 10.2 folds to give a final drawn product. The drawn product has a round sectional area (diameter: 1.1 mm) and has a tenacity of 24 g/d and an initial modulus of 690 g/d.

EXAMPLE 2

Polyethylene (viscosity average molecular weight: $2 \times 10^6$) is mixed with decaline, and the mixture is heated at 150° C. to give a solution having a polyethylene content of 3.2% by weight. The solution is cooled to room temperature to form a gel. The gel is separated by filtration and then is pulverized with a homomixer. The gel thus prepared contains particles and has a polyethylene content of 12.5% by weight.

The gel-like particles thus obtained are formed into a sheet-like material, and then it is continuously supplied to a press roll at 50° C. to give a band-shaped compressed material. Said roll has a diameter of 12 cm and is given by a load of 8 kg per 1 cm of the running length of the compressed material to be supplied. The compressed material thus obtained has a polyethylene content of 45% by weight.

The compressed material thus obtained is heated to 120° C. and is drawn by stretching with a pair of rolls each having a different peripheral speed at a draw ratio of 12. The compressed sheet is further heated to 140° C. and is drawn at a draw ratio of 4.6 in the same manner to give a tape-like drawn product (thickness: 0.02 mm, width: 10 mm). The tape-like drawn product has a tenacity of 310 kg/mm$^2$ and an initial modulus of 11,000 kg/mm$^2$.

EXAMPLE 3

Polyethylene (viscosity average molecular weight: $2 \times 10^6$) is mixed with decaline, and the mixture is heated at 150° C. to give a solution having a polyethylene content of 3.0% by weight. The solution is cooled to room temperature to form a gel. The gel is pulverized with a homomixer, and the separated liquid is removed by filtration. The gel thus prepared contains particles and has a polyethylene content of about 7.6% by weight.

The particle-shaped gel thus obtained is formed into a sheet-like material, and then is supplied in a uniform thickness to a flat pressing device at room temperature and pressed under a pressure of 200 kg/cm$^2$, whereby liquid is further squeezed out and there is obtained a plate-shaped material (thickness: 0.26 mm, polyethylene content: 81% by weight).

The plate-shaped material thus obtained is cut in a tape-like shape (width: 3 mm) and then is drawn by stretching with a pair of rolls in the same manner as described in Example 2 in a boiling water of 100° C. at a draw ratio of 15. Thereafter, the material is drawn in an air vessel at 130° C. at a draw ratio of 2 and further at 140° C. at a draw ratio of 2 likewise (total draw ratio: 60) to give a tape-like drawn product (width: about 1 mm). The tape-like drawn product has a size of 96 denier and a tenacity of 35 g/d and an initial modulus of 1,200 g/d.

EXAMPLE 4

Polypropylene (intrinsic viscosity: 18 at 135° C. in decaline) is mixed with p-xylene, and the mixture is heated at 135° C. to give a solution having a polypropylene content of 2% by weight. The solution is cooled gradually to room temperature to form a gel, and the gel is pulverized with a homomixer.

The gel dispersion thus obtained is filtered with a filter to give a gel-like sheet material. The gel-like sheet material thus obtained is compressed with a pair of rotating rolls while squeezing out the liquid to give a compressed sheet. The compressed sheet thus obtained (thickness: 0.7 mm) has a polypropylene content of 72% by weight.

The compressed sheet thus obtained is passed through a drawing die having a round section while heating and is further drawn while heating at a draw ratio of 42. The drawn product has a round section (diameter: 0.5 mm) and has a tenacity of 12 g/d and an initial modulus of 250 g/d.

EXAMPLE 5

Polyvinyl alcohol (viscosity average molecular weight: about 800,000, the polymerization degree: about 20,000), which is prepared by saponifying polyvinyl acetate obtained by bulk polymerization of vinyl acetate, is mixed with glycerin, and the mixture is heated at 190° C. to give a solution having a polyvinyl alcohol content of 3% by weight. The solution is cooled gradually to room temperature to form a gel, and the gel is pulverized with a homomixer to give a gel dispersion which consists of gel-like particles and the solvent.

The gel dispersion thus obtained is filtered with a filter to give a gel-like sheet material. The gel-like sheet material thus obtained is compressed with a pair of rotating rolls while squeezing out the liquid to give a compressed sheet. The compressed sheet thus obtained (thickness: 0.7 mm) has a polyvinyl alcohol content of 65% by weight.

The compressed sheet thus obtained is washed with methanol to remove glycerin and is drawn while heating at a high temperature at a draw ratio of 20. The drawn product has a thickness of 0.12 mm and has a tenacity of 15 g/d and an initial modulus of 341 g/d.

EXAMPLE 6

In the same manner as described in Example 1 except that the opening diameter of the die and the total draw ratio are changed as shown in Table 1, there are formed various sheet-like materials consisting of gel-like particles. The materials are compressed, drawn with a die and further drawn in a heated air vessel at 135° C. likewise to give final drawn products. The properties of the final products are shown in Table 1.

TABLE 1

| Run No. | Width of compressed sheet (mm) | Diameter of die opening (mm) | Total draw ratio | Final drawn product Sectional area (mm$^2$) | Tenacity (g/d) | Initial modulus (g/d) |
| --- | --- | --- | --- | --- | --- | --- |
| 1 | 50 | 2 | 110 | 0.13 | 30 | 1010 |
| 2 | 110 | 3 | 93 | 0.34 | 28 | 920 |
| 3 | 150 | 4 | 82 | 0.51 | 25 | 750 |
| 4 | 200 | 5 | 75 | 0.75 | 24 | 680 |

EXAMPLE 7

Polyethylene (viscosity average molecular weight: 3.5×10$^6$) is mixed with decaline, and the mixture is heated at 160° C. to give a solution having a polyethylene content of 2% by weight. The solution is passed through a slit and then rapidly cooled to form a gel-like film (thickness: 11.5 mm), which keeps a uniform shape while containing a large amount of decaline.

The gel-like film thus obtained is passed through a gap between three pairs of rolls in order at room temperature (27° C.), while squeezing out the separated liquid, by which a compressed sheet is formed. Said rolls (diameter of rolls: 300 mm, gaps between the rolls in three pairs: 5 mm, 1.2 mm, and 0.3 mm, respectively) are rotated at the optimum speed which is gradually higher in the order of 3rd, 2nd and 1st rolls in three pairs. The compressed sheet thus obtained (thickness: 0.32 mm) has a polyethylene content of 71% by weight, which is not broken even if it is folded.

The compressed sheet thus obtained is slit in a width of 200 mm, and the thus-slit sheets are supplied to a drawing die while folding in a width of about 15 mm, and thereby are drawn at a rate of 1.0 m/minute. The drawing die has a round opening (diameter: 4 mm, length: 5 mm) and is provided with a conical introducing part (half angle: 10°) and is maintained at 120° C. By the drawing with a die, the compressed sheet gives a drawn product having a round section (diameter: 3.2 mm) and has neither crevice nor marks due to folding of the compressed sheet.

The drawn product is further drawn by stretching with a pair of rolls each having a different peripheral speed within an air vessel at 135° C. to give a final drawn product. Total draw ratio is 92. The drawn product has a round sectional area (diameter: 0.8 mm) and has a tenacity of 23 g/d and an initial modulus of 760 g/d.

REFERENCE EXAMPLE 1

A gel-like film (thickness: 11.5 mm) prepared in the same manner as described in Example 7 is likewise subjected to drawing except that it is not compressed with rolls. The drawing is carried out in three steps at a temperature lower than the melting point of the material, i.e. at 70° C. (in the first drawing), at 110° C. (in the second drawing), and at 135° C. (in the third drawing). In this method, the total draw ratio is merely 12, and the obtained drawn product shows a tenacity of 8 g/d and an initial modulus of 180 g/d.

What is claimed is:

1. A process for producing a drawn product of a crystalline polymer having high tenacity and high modulus, which comprises compressing a gel-like material prepared from a solution of a crystalline polymer in a solvent at a temperature lower than the temperature at which the gel-like material is dissolved, thereby removing a part of the solvent contained in the gel-like material, and drawing the compressed material to obtain a product with high tenacity high modulas and large cross-section, said gel-like material prepared from a solution of a crystalline polymer in a solvent being a gel-like sheet material consisting of gel-like particles of a crystalline polymer and a solvent which is prepared by cooling the solution of a crystalline polymer in a solvent.

2. The process according to claim 1, wherein the crystalline polymer is a polyethylene type polymer having a weight average molecular weight of 3×10$^5$ or more.

3. The process according to claim 1, wherein the drawing of the compressed material is done by drawing it through a die and then drawing without a die.

4. The process according to claim 3, wherein the drawing is done at total draw ratio of at least 20.

5. The process according to claim 3, wherein the drawing is done at total draw ratio of at least 40.

6. The process according to claim 1, wherein the solution of a crystalline polymer in a solvent has a concentration of the polymer higher than the concentration at which the polymer starts to form mutual entanglement in the solution.

7. The process according to claim 1, wherein the compressed material has a content of the solvent of not more than 60% by weight.

8. The process according to claim 1, wherein the compressed material has a content of the solvent of not more than 40% by weight.

9. The process according to claim 1, wherein the gel-like particles of a polymer have an average particle size of not more than 1 mm.

* * * * *